United States Patent
Fork

[15] 3,701,837
[45] Oct. 31, 1972

[54] MULTIPLE ELECTRICAL SERVICE UNDERFLOOR ACCESS HOUSING

[72] Inventor: Frank W. Fork, Allison Park, Pa. 15101

[73] Assignee: H. H. Robertson Co., Pittsburgh, Pa.

[22] Filed: March 18, 1971
[21] Appl. No.: 125,490

Related U.S. Application Data

[63] Continuation-in-part of Ser. No. 862,277, Sept. 30, 1969, abandoned.

[52] U.S. Cl. ............... 174/50, 52/221, 174/49, 174/96, 220/3.4, 220/3.94
[51] Int. Cl. ............... H02g 3/08, H02g 3/28
[58] Field of Search.......... 174/48, 49, 50, 51, 53, 57, 174/68 C, 70 C, 71 R, 72 R, 72 C, 95–98, 101; 52/221; 138/92, 103, 105, 111, 115, 116, 117; 220/3.2, 3.3, 3.4, 3.94

[56] References Cited

UNITED STATES PATENTS

| | | | |
|---|---|---|---|
| 2,073,490 | 3/1937 | Lewin | 174/96 UX |
| 3,236,545 | 2/1966 | Parkes et al. | 220/3.4 X |
| 3,303,264 | 2/1967 | Saul et al. | 174/48 |
| 3,417,191 | 12/1968 | Fork | 174/96 X |
| 3,433,886 | 3/1969 | Myers | 174/57 |
| 3,472,945 | 10/1969 | Trachtenberg | 174/53 |

FOREIGN PATENTS OR APPLICATIONS

| | | | |
|---|---|---|---|
| 1,267,739 | 5/1968 | Germany | 174/48 |
| 369,805 | 7/1963 | Switzerland | 174/48 |

*Primary Examiner*—Laramie E. Askin
*Attorney*—Harry B. Keck

[57] ABSTRACT

An underfloor access housing adapted for use with electrical raceway sections of the type normally placed in building floors. The access housing spans across adjoining raceways and is provided with inlet openings, each communicating with one of the adjoining raceways, and a central dual outlet opening providing communication between the interior of the housing and the space above the floor level. A partition detachably retained within the housing, divides the interior of the housing into separate compartments, each including one of the inlet openings. The partition is adapted to support an electrical plug receptacle whereby electrical connections may be made beneath the level of the finished floor.

11 Claims, 14 Drawing Figures

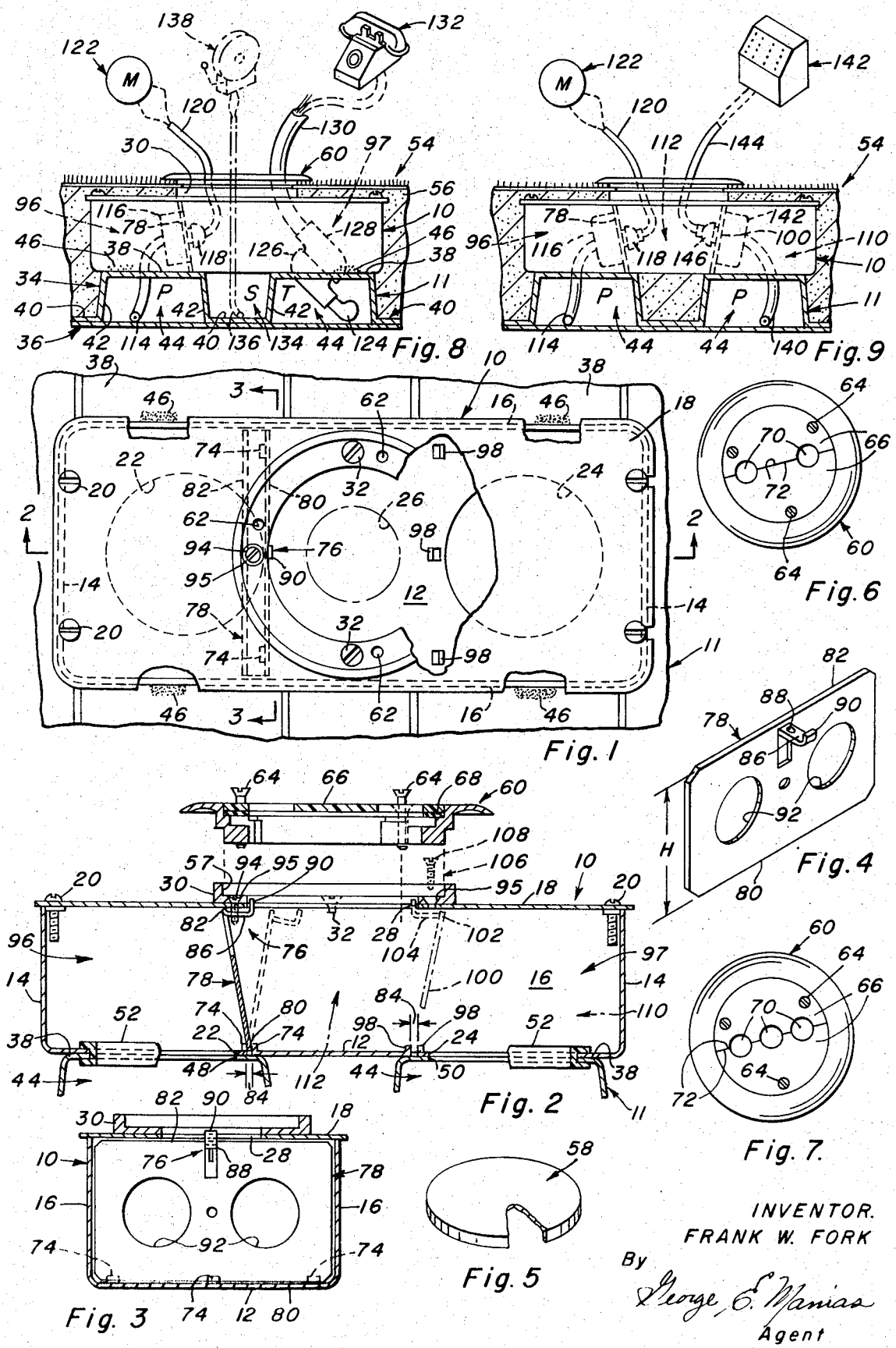

INVENTOR
FRANK W. FORK
BY
George E. Manias
Agent 3,701,837

MULTIPLE ELECTRICAL SERVICE UNDERFLOOR ACCESS HOUSING

CROSS-REFERENCES TO RELATED APPLICATIONS

This application is a continuation-in-part of copending application, Ser. No. 862,277, filed Sept. 30, 1969, now abandoned.

BACKGROUND OF THE INVENTION

1. Field of the Invention

This invention relates to an underfloor access housing of the type providing access to a plurality of electrical services at one location in the floor, and more particularly to improved partition means for such access housings and improved partition retaining means therefor.

2. Description of the Prior Art

Numerous types of housings are known in the prior art, which are adapted for use with underfloor electrical raceways; which span the distance between and communicate with adjoining raceways; and which provide access to multiple electrical services.

One type of housing, when in use, is either partly or totally exposed to view. Such a housing has a base portion communicating directly with two separate electrical raceways and an upper portion carrying one or more electrical plug receptacles and/or grommeted openings suitable for passage of telephone wiring, and the like. Such a housing may be provided with a partition which divides the interior of the housing into separate chambers each conveying a particular type of electrical service. See, for example, U.S. Pat. No. 2,073,490.

Another type of housing, better known as a base cup, communicates directly with separate underfloor electrical raceways and includes a partition for dividing the interior of the housing into separate chambers. One such housing is adapted to be secured to the underfloor electrical raceway and be substantially entirely covered by concrete, see for example U.S. Pat. No. 3,303,264. Such a housing is also known as a "pre-set insert"; that is, the housing is secured to the underfloor electrical raceways prior to pouring the concrete. Such an enclosure is provided with a cover to prevent ingress of concrete. When the housing is to be activated, the cover is exposed and replaced with a suitable electrical fitting at the floor level. Another such housing is adapted to be installed after the concrete has been poured and hardened. That is, an opening is made in the concrete floor at a preselected location above the electrical raceway. The housing is then inserted into the opening and is secured in place. Such a housing is known as an "after-set insert". See for example U.S. Pat. No. 3,417,191.

A further type of housing is known which, when in use, projects above the level of the finished floor and when not in use is recessed within the floor. See, for example, U.S. Pat. No. 3,433,886. Such a housing may include partition means providing separate chambers for conveying power and telephone conductors.

SUMMARY OF THE INVENTION

The principal object of this invention is to provide an improved underfloor access housing providing access to different electrical services at one location on and beneath the finished surface of a floor structure.

Another object of this invention is to provide an improved underfloor access housing having a partition adapted to support a plug receptacle, whereby electrical connections can be made beneath the level of the finished floor.

A further object of this invention is to provide improved partition retaining means for detachably securing a partition within and to the housing.

A still further object of this invention is to provide an underfloor access housing having a partition which may be removed while the housing is embedded in concrete, for the attachment of electrical plug receptacles, and the like, and which may be reinstalled into the housing with the plug receptacle attached.

The present invention provides an electrical access housing adapted for use with electrical raceway sections of the type normally placed in a building floor. The access housing is adapted to span the distance between and to be secured to the crests of adjoining raceways, and to be surrounded by a subsequently poured layer of concrete. The housing includes upstanding perimeter walls, and a top wall provided with a central dual outlet opening for gaining access to the interior of the housing from the floor level. The housing may include a bottom wall provided with spaced-apart inlet openings, each providing communication into one of the subjacent electrical raceways. Alternatively, the housing may be opened at its bottom, in which instance, means is provided for preventing ingress of the subsequently poured layer of concrete into the interior of the housing.

In accordance with the present invention, fastening means is provided adjacent to the periphery of the dual outlet opening. Edge receiving means, such as, a set of edge receiving lugs, is provided in the housing below the fastening means and at a level proximate to the lower edges of opposite ones of the upstanding perimeter walls. A partition is positioned within the housing, has a lower edge captively retained by the edge receiving means and an upper edge secured by the fastening means. The partition divides the interior of the electrical access housing into separate compartments one of which contains the dual outlet opening. The overall arrangement of the edge receiving means is such that a partition is pivotal about its lower edge toward and away from the dual outlet opening. Moreover the partition is sized to pass through the dual outlet opening. Thus with the electrical access housing installed in a building floor, the partition may be removed through the central outlet opening for attachment of a plug receptacle, for example, and installed within the housing.

Further in accordance with the present invention, second edge receiving means, such as, a second set of edge receiving lugs, is provided in the housing at a location spaced from the first edge receiving means and below the periphery of the dual outlet opening. With the provision of two edge receiving means, the partition may be installed adjacent to either side of the dual outlet opening and, hence, adjacent to either of the openings provided in the subjacent electrical raceways.

The present invention also contemplates the use of a second partition having a lower edge captively retained by the second edge receiving means and an upper edge secured by second fastening means. When two partitions are employed, the interior of the access housing is divided into a central compartment and end compartments, one on each side of the central compartment. Each of the end compartments communicates with a subjacent electrical raceway through an inlet opening. The central compartment communicates with the interior of the building through the dual outlet opening. Where the access housing includes a bottom wall, an additional inlet opening may be provided in the bottom wall positioned between the spaced-apart inlet openings. In this instance, passage of three different types of electrical service through the inlet openings into the housing is possible.

BRIEF DESCRIPTION OF THE DRAWINGS

FIG. 1 is a plan view with portions broken away to show detail, illustrating the electrical access housing of this invention secured to an underfloor electrical raceway section;

FIG. 2 is a cross-sectional view, taken along the line 2—2 of FIG. 1;

FIG. 3 is a cross-sectional view, taken along the line 3—3 of FIG. 1;

FIG. 4 is an isometric view of a partition employed in the electrical access housing of this invention;

FIG. 5 is an isometric view of a temporary closure cap;

FIG. 6 is a plan view of a finishing ring used with the electrical access housing of this invention;

FIG. 7 is a plan view, similar to FIG. 6, illustrating an alternative finishing ring;

FIGS. 8 and 9 are cross-sectional views taken transversely through a building floor, illustrating the electrical access housing of this invention embedded in concrete and alternative uses thereof;

DESCRIPTION OF THE PREFERRED EMBODIMENT(S)

Figure 10:
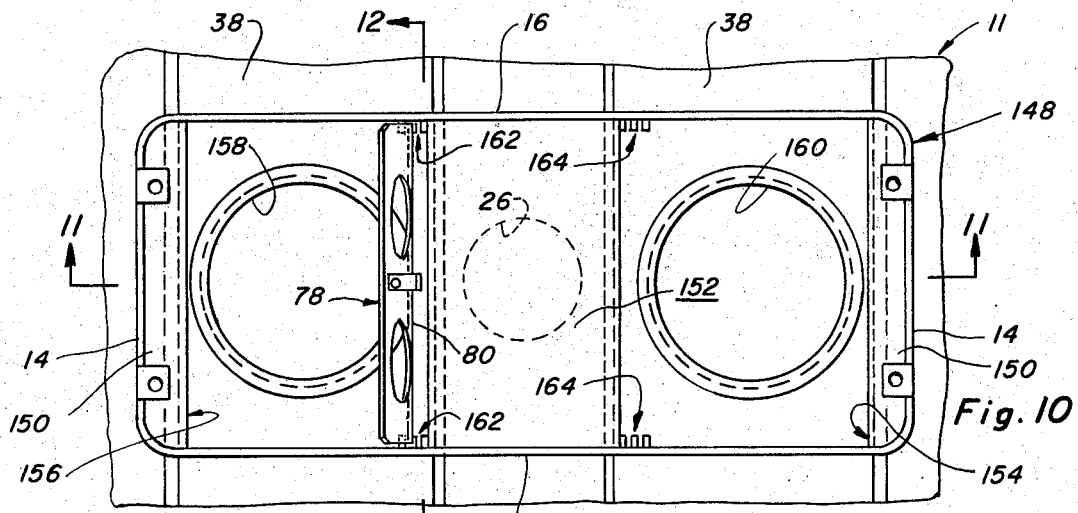
FIG. 10 is a plan view similar to FIG. 1, illustrating an alternative embodiment of the present electrical access housing with the top wall removed to show detail.

Referring to FIGS. 1–3, there is illustrated an underfloor access housing 10 secured to an electrical raceway section 11. The access housing 10 comprises a bottom wall 12, upstanding end walls 14 and side walls 16, and a top wall 18. The top wall 18 may be detachably secured to the walls 14, 16 by fasteners 20. The bottom wall 12 is provided with spaced-apart inlet openings 22, 24. As will be described later in the specification, the bottom wall may be provided with an additional inlet opening 26 disposed between the spaced-apart inlet openings 22, 24.

The top wall 18 is provided with a central dual outlet opening 28. A mounting ring 30 surrounds the dual outlet opening 28 and is secured to the top wall 18 by plural fasteners 32.

The present access housing 10 is particularly adapted for use with electrical raceway sections of the type normally placed in building floors. Referring to FIG. 8, a typical electrical raceway section 11 may include a corrugated upper metal sheet 34 and a correlative lower metal sheet 36. The corrugated upper metal sheet 34 presents alternating crests 38 and valleys 40 and generally vertical side walls 42 connecting adjacent ones of the crests 38 and valleys 40. The correlative lower sheet 36 is secured to the valleys 40 of the upper metal sheet 34 and cooperates with the crests 38 and generally vertical side walls 42 to define enclosed electrical raceways or cells 44 extending longitudinally of the raceway section 11.

When the present access housing 10 is installed, the bottom wall 12 spans the distance between the crests 38 of the adjacent cells 44 and is secured to the crests 38, for example, by tack welds 46 (FIGS. 1 and 8). As best illustrated in FIG. 2, the crests 38 are provided with openings 48, 50 corresponding with the openings 22, 24 in the bottom wall 12. A grommet 52 (FIG. 2) may be applied to the edges of each corresponding pair of openings 22, 48 and 24, 50. Each pair of corresponding openings 22, 48 and 24, 50 provides communication between the electrical raceways 44 and the interior of the enclosure 10.

Referring to FIG. 8, there is illustrated a building floor 54 wherein the present access housing 10 and the electrical raceway section 11 are surrounded by concrete 56. Prior to pouring of the concrete 56, a closure cap 58 (FIG. 5) may be inserted into a recess 57 of the mounting ring 30 as a temporary seal for the dual outlet opening 28 (FIG. 1) to prevent ingress of debris, concrete and the like during the construction of the building floor 54. The closure cap 58 may be formed from suitable plastics, light gauge metals and the like. The closure cap 58 may be retained in the recess 57 by a press-fit. After the concrete 56 has hardened, the closure cap 58 is removed and a finishing ring 60 is secured to the mounting ring 30.

Referring to FIGS. 1 and 2, the mounting ring 30 is provided with threaded openings 62 (FIG. 1) adapted to receive fasteners 64 (FIG. 2) which secure the finishing ring 60 to the mounting plate 30. The finishing ring 60 is provided with a cover 66 and a gasket 68.

As best shown in FIGS. 6 and 7, the cover 66 of the finishing ring 60, is provided with a plurality of openings 70 for the passage of electrical wiring of different electrical services, as will be described. The cover 66 may be formed in two pieces having abutted edges 72 which are colinear with a common diameter of the openings 70.

PRESENT IMPROVEMENT

In accordance with the present invention and as best illustrated in FIGS. 1–3, inclusive, the access housing 10 is provided with edge receiving means, such as a set of edge receiving lugs 74 formed in the bottom wall 12 and positioned adjacent to one of the inlet openings, for example, the inlet opening 22; fastening means 76 adjacent to the periphery of the dual outlet opening 28 and positioned above the edge receiving lugs 74; and a partition 78 having a lower edge 80 captively retained by the edge receiving lugs 74 and an upper edge 82 secured by the fastening means 76. The edge receiving lugs 74 may comprise punched-up portions of the bottom wall 12, which are aligned transversely of the bottom wall 12 and are spaced-apart by a distance indicated by the dimension line 84 (FIG. 2). Preferably, the spacing 84 is greater than the thickness of the partition 78 whereby the partition 78 is pivotal about its lower edge 80 between that position shown in full lines and the position shown in dotted outline.

Referring to FIG. 4, the partition 78 has a height indicated at H which is less than the inner diameter of the dual outlet opening 28 (FIG. 1). The size of the partition 78 and its pivoting about the lower edge 80, facilitate removal and installation of the partition 78 through the dual outlet opening, while the housing 10 is embedded in concrete 56 (FIG. 8).

The partition 78 also is provided with a tab 86 having an opening 88. The tab 86 may terminate in an upturned end 90 which facilitates pivoting of the partition 78 between the full line and dotted line positions illustrated in FIG. 2. The partition 78 also may be provided with one or more openings 92, adapting the partition 78 to support a simplex or duplex plug receptacle.

Referring to FIG. 2, the fastening means 76 may comprise a fastener, such as a self-tapping screw 94, extending downwardly through fastener receiving openings 95 provided in the mounting ring 30 and the top wall 18, into threaded engagement with the tab 86. The partition 78 is rigidly held by the lugs 74 and screw 94 in the inclined position illustrated in FIG. 2. The partition 78 divides the interior of the housing 10 into separate compartments 96, 97 each containing one of the inlet openings 22, 24. As shown in FIG. 2, the compartment 97 also contains the central dual outlet opening 28.

Further in accordance with the present invention and as best illustrated in FIGS. 1 and 2, the bottom wall 12 may be provided with second edge receiving means, such as a second set of edge receiving lugs 98 positioned adjacent to the other inlet opening, for example the inlet opening 24. In this embodiment, the partition 78 may be installed adjacent to either of the inlet openings 22, 24 — the self-tapping screw 94, being used in either instance, to secure the upper edge 80 of the partition 78.

Still further in accordance with the present invention, a second partition 100 (shown in dash-dot outline in FIG. 2) may be provided, having a lower edge (not visible) captively retained by the second set of edge receiving lugs 98 and having an upper edge 102 having a tab 104 adjacent thereto. Second fastening means 106 is provided, which may comprise an additional self-tapping screw 108 (shown in dotted outline). When installed, the screw 108 will extend downwardly through the fastener receiving opening 95 provided in the mounting ring 30 and the top wall 18, into threaded engagement with the tab 104. With the second partition 100 in position, the interior of the housing 10 is further divided into an end compartment 110, similar to the end compartment 96, and a central compartment 112. The second partition 100 may be a duplicate of the first partition 78 — being provided with openings (not visible) adapting the partition 100 to support simplex or duplex plug receptacles.

USES OF ACCESS HOUSING 10

Referring to FIG. 8, the access housing 10 provides access to different electrical services at one location in the floor 54. For example, the raceway, labeled P, may serve to convey a power conductor 114 from a remote location in the floor 54 into the end compartment 96 of the housing 10. The power conductor 114 may be connected to a plug receptacle 116 mounted on the partition 78. By removing the cover (not visible) from the finishing ring 60, a plug 118 of a power cord 120 may be inserted into the receptacle 116 thereby connecting the power conductor 114 to a load, such as a motor schematically illustrated at 122.

The adjacent raceway, labeled T, may serve to convey a multiple strand telephone cable 124 terminating in a female connector 126. By removing the cover (not visible) from the finishing ring 60, a male connector 128 of a complementary multiple strand telephone cable 130 may be connected to the female connector 126 thereby completing electrical connections to a plurality of telephones, one of which is illustrated at 132. It will be noted that the telephone connectors 126, 128 and the plug 118 are positioned entirely within the housing 10 and therefore are not visible to an occupant of the space above the floor 54.

Referring to FIG. 8, the present access housing 10 is also suitable for use with electrical wiring distribution systems wherein a raceway 134, defined in part by the valley 40 and adjoining side walls 42, conveys electrical wiring. Such a system is described and illustrated in my copending application, Ser. No. 822,390, filed May 7, 1969, now U.S. Pat. No. 3,592,956. The raceway 134, labeled S, may serve to convey low voltage signal wiring 136, shown in dash-dot outline, for operating fire alarms, burglar alarms and the like. The signal wiring 136 will extend upwardly through the additional inlet opening 26 (FIG. 1) into the interior of the access housing 10 and out through the finishing ring 60. The signal wiring 136 may be connected, for example, to an alarm illustrated in dotted outline at 138.

Alternatively, as shown in FIG. 9, the adjacent cells 44 of the electrical raceway section 11 both may serve to convey power conductor 114, 140. The power conductor 140 may extend into the end compartment 110 and be connected to a plug receptacle 142 mounted on the second partition 100. Electrical power may be supplied, for example, to a computer 142 by a cord 144. A plug 146 at the end of cord 144 is positioned within the central compartment 112 and is connected to the plug receptacle 142. In this instance, all electrical connections are made beneath the level of the floor 54 and are not visible to an occupant of the space above the floor 54.

ALTERNATIVE EMBODIMENTS

Alternative embodiments of the present electrical access housing are illustrated in FIGS. 10 to 13, inclusive, and 14. Corresponding numerals will be employed to identify corresponding parts heretofore described.

Figure 11:
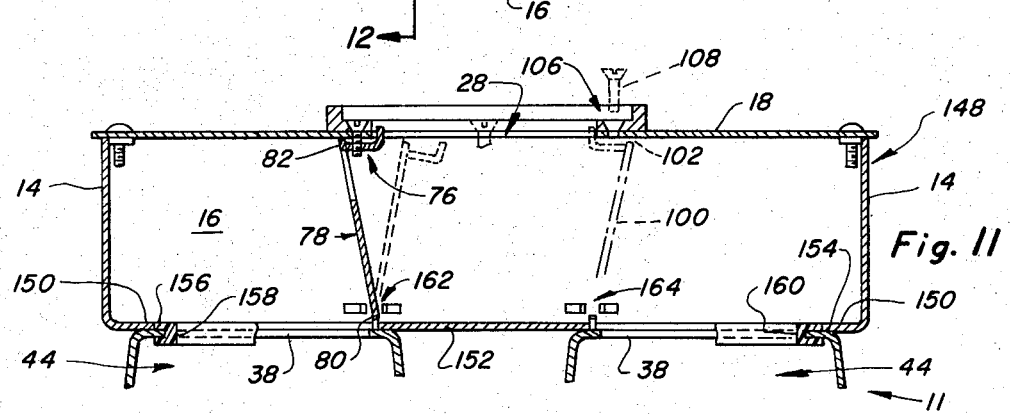
FIGS. 11 and 12 are cross-sectional views taken along the lines 11—11 and 12—12 respectively of FIG. 10, illustrating the access housing with the top wall installed.
Figure 12:
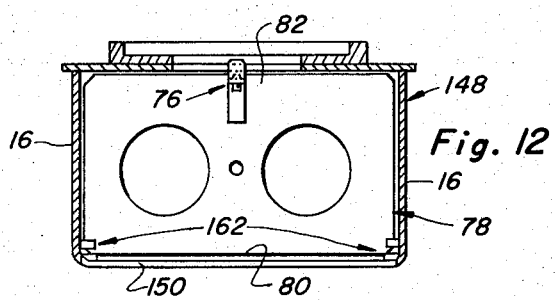

FIGS. 10 to 12 illustrate an electrical access housing 148 (with top wall removed) secured to the electrical raceway section 11. The bottom of the access housing 148 is provided with opposite edge strips 150 overlying the remote edges of the adjacent crests 38, and a central strip 152 spanning the distance between and overlying the adjacent edges of the adjacent crests 38. The edge strips 150 and the central strip 152 define spaced-apart inlet openings 154, 156 which cooperate with grommeted openings 158, 160 in the crests 38 to provide communication between the interior of the raceways 44 (FIG. 11) and the interior of the housing 148. The edge strips 150 and the central strip 152 also serve to prevent ingress of a subsequently poured layer of concrete into the interior of the access housing 148.

In this embodiment, edge receiving means in the form of a set of edge receiving lugs 162 is provided in the housing 148. The edge receiving lugs 162 are formed in the opposite side walls 16 adjacent to the inlet opening 156, for example. As best shown in FIG. 11, the edge receiving lugs 162 are adapted to captively retain the lower edge 80 of the partition 78. The upper edge 82 of the partition 78 is secured by the fastening means 76. The configuration of the edge receiving lugs 162 is such that the partition 78 may be pivoted about its lower edge toward and away from the dual outlet opening 28 provided in the top wall 18.

The housing 148 may be provided with second edge receiving means, such as, a second set of edge receiving lugs 164 which are spaced from the first edge receiving lugs 162 and are positioned below the periphery of the dual outlet opening 28 (FIG. 11). In the presence of the second set of edge receiving lugs 164, the partition 78 may be positioned adjacent to the inlet opening 156 or may be positioned adjacent to the other inlet opening 154. Alternatively, a second partition 100 (shown in dash-dot outline in FIG. 11) may be provided having a lower edge (not visible) captively retained by the second set of edge receiving lugs 164 and having its upper edge secured to the periphery of the dual outlet opening 28 by second fastening means 106, such as, the self-tapping screw 108 (shown in dotted outline). Where both the partitions 78, 100 are employed, the central strip 152 may be provided with an additional inlet opening 26 (shown in dash-dot outline in FIG. 10).

Figure 13:
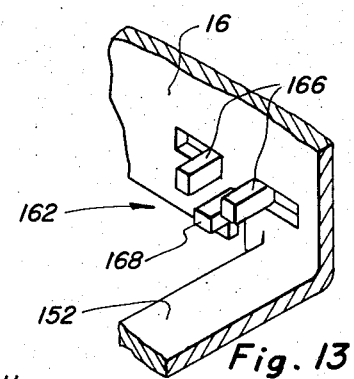
FIG. 13 is a fragmentary isometric view illustrating edge receiving lugs incorporated in the embodiment of FIG. 10.

FIG. 13 illustrates one of the set of edge receiving lugs 162. It is to be understood that the second edge receiving lugs 164 are identical to the first edge receiving lugs 162 and that the following description applies equally to the second edge receiving lugs 164. It will be observed in FIG. 13 that the edge receiving lugs 162 include opposed lugs 166 formed from the side wall 16 and a central lug 168 also formed from the side wall 16. The opposed lugs 166 serve to captively retain the lower edge of the partition. The central lug 168 serves to temporarily support the partition until such time as the upper edge of the partition is secured by the fastening means, as described above. It is to be understood that the edge receiving lugs may be integrally formed in the housing 148 or may comprise extrinsic elements attached thereto.

Figure 14:
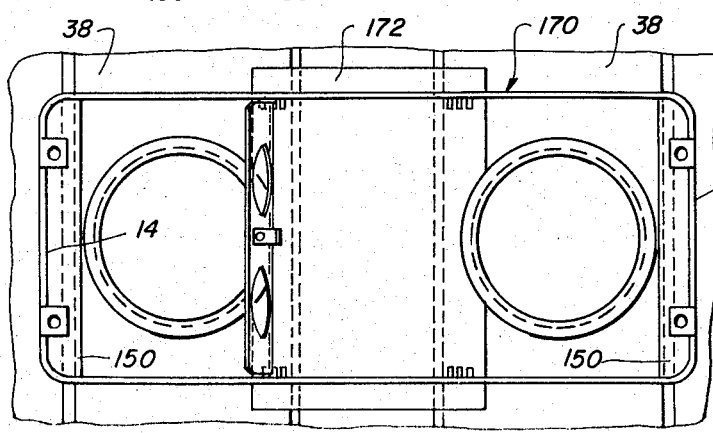
FIG. 14 is a plan view similar to FIG. 10, illustrating a further alternative embodiment of the present electrical access housing.

FIG. 14 illustrates a further alternative embodiment of the present electrical access housing which is identified generally by the numeral 170. In this embodiment, the bottom of the access housing 170 is provided only with the edge strips 150. It will be observed in FIG. 14, that a sheet 172 of suitable material, such as, adhesive tape or other relatively strong material, spans the distance between and is secured to the adjacent edges of the adjacent crests 38 of the electrical raceway section 11. The sheet 172 prevents ingress of concrete into the interior of the housing 170. It should also be apparent that the edge strips 150 may be eliminated. In this instance, sheets, similar to the sheet 172 may be applied along the opposite edges of the housing 170 to prevent ingress of concrete in the region between the end walls 14 and the adjacent edges of the crests 38.

I claim:

1. An electrical access housing adapted to span the distance between and to be secured to the crests of adjacent raceways of an underfloor electrical raceway section, said electrical access housing being open at its bottom and including upstanding perimeter walls, and a top wall provided with a central dual outlet opening, the improvement comprising:
   fastening means adjacent to the periphery of said dual outlet opening;
   edge receiving means in said housing, positioned below said fastening means and at a level proximate to the lower edges of opposite ones of said upstanding perimeter walls; and
   a partition having a lower edge captively retained by the said edge receiving means and an upper edge secured by said fastening means, said partition dividing the interior of said electrical access housing into separate compartments one of which contains said dual outlet opening.

2. The improvement of claim 1 wherein said edge receiving means are formed in said opposite ones of said upstanding perimeter walls adjacent to the lower edges thereof.

3. The improvement defined in claim 1 wherein said access housing includes a bottom wall provided with spaced-apart inlet openings, one in each of said separate compartments; and wherein
   said edge receiving means are formed in said bottom wall adjacent to one of said inlet openings.

4. The improvement of claim 1 wherein the height of said partition is less than the inner diameter of said dual outlet opening, whereby said partition may be removed from and introduced into the interior of said access housing through said dual outlet opening.

5. The improvement defined in claim 1 wherein the spacing between said edge receiving means is greater than the thickness of said partition, whereby said partition is pivotal about said lower edge toward and away from said dual outlet opening.

6. The improvement defined in claim 1 wherein said partition is inclined from said edge receiving means away from said dual outlet opening.

7. The improvement defined in claim 1 wherein said partition includes a tab extending toward said dual outlet opening, and wherein said fastening means comprises a fastener extending downwardly through said top wall and threadedly engaged with said tab.

8. The improvement defined in claim 1 including
   second edge receiving means in said housing, spaced from the first said edge receiving means and positioned below the periphery of said dual outlet opening.

9. The improvement defined in claim 1 including
   second fastening means within said dual outlet opening, and opposite the first said fastening means;

second edge receiving means in said housing, positioned below said second fastening means and spaced from said first edge receiving means; and a second partition having a lower edge captively retained by said second edge receiving means and an upper edge secured by said second fastening means, said second partition cooperating with the first said partition to divide the interior of said access housing into a central compartment containing said dual outlet opening and end compartments, one on each side of said central compartment.

10. The improvement defined in claim 9 wherein said access housing includes a bottom wall having spaced-apart inlet openings, one communicating with each of said end compartments.

11. The improvement defined in claim 10 wherein said bottom wall has an additional inlet opening communicating with said central compartment.

* * * * *